United States Patent [19]

Hashimoto

[11] Patent Number: 4,478,436
[45] Date of Patent: Oct. 23, 1984

[54] HOSE CONNECTOR

[75] Inventor: Nobuyuki Hashimoto, Toyota, Japan

[73] Assignee: Aisin Seiki Kabushiki Kaisha, Kariya, Japan

[21] Appl. No.: 547,464

[22] Filed: Nov. 2, 1983

Related U.S. Application Data

[63] Continuation of Ser. No. 202,239, Oct. 30, 1980, abandoned.

[30] Foreign Application Priority Data

Nov. 5, 1979 [JP] Japan ................................ 54-143500

[51] Int. Cl.³ .............................................. F16L 39/00
[52] U.S. Cl. .................... 285/137 R; 285/174; 285/231; 277/207 A
[58] Field of Search ............... 285/137 R, 231, 345, 285/230, 174 (U.S. only), 374 (U.S. only); 277/207 A, 208, 209, 210

[56] References Cited

U.S. PATENT DOCUMENTS

| | | | |
|---|---|---|---|
| 2,032,492 | 3/1936 | Nathan | 285/231 X |
| 2,396,491 | 3/1946 | Chamberlain | 277/209 |
| 3,386,745 | 6/1968 | Hein | 277/209 X |
| 3,523,700 | 8/1970 | Palmer | 285/137 R |
| 3,822,068 | 7/1974 | Litherland | 277/208 |

FOREIGN PATENT DOCUMENTS

| | | | |
|---|---|---|---|
| 647178 | 8/1964 | Belgium | 277/208 |
| 2112798 | 10/1972 | Fed. Rep. of Germany | 285/231 |
| 1118630 | 3/1956 | France | 277/209 |
| 1523311 | 3/1968 | France | 285/137 R |
| 1156031 | 6/1969 | United Kingdom | 285/137 R |

Primary Examiner—Thomas F. Callaghan
Attorney, Agent, or Firm—Oblon, Fisher, Spivak, McClelland & Maier

[57] ABSTRACT

A hose connector for at least one hose of a fluid operating device which includes a housing having a plurality of ports formed therein such that each of the plurality of hoses is interconnected with a corresponding port and including an elastic bushing mounted within the housing adjacent each of the plurality of ports for fluid communication with the fluid operating device. Each of the bushings is physically mounted within an opening formed in the housing and may include a plurality of annular seals formed on the outer periphery thereof and a plurality of annular seals formed on the inner periphery thereof.

3 Claims, 6 Drawing Figures

HOSE CONNECTOR

This application is a continuation of application Ser. No. 202,239, filed Oct. 30, 1980 and now abandoned.

BACKGROUND OF THE INVENTION

1. Field of the Invention

This invention relates to a hose connector for a fluid pressure operating device attached in automobiles.

2. Description of the Prior Art

Conventional vacuum operating devices are connected with the ports of another vacuum operating device by hoses which are independent of each other. Accordingly, the hose may be improperly connected to the ports of the device during assembly or repair thereof.

SUMMARY OF THE INVENTION

It is a principal object of the instant invention to provide an improved connector having a simplified structure which may connect a plurality of hoses with a plurality of ports.

In order to ensure the correct connection of the hoses, it is necessary to simplify the structure of the connector. The instant invention provides a connector having a bushing member with an opening capable of being deflected and connecting each hose with each port of the fluid pressure operating device.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
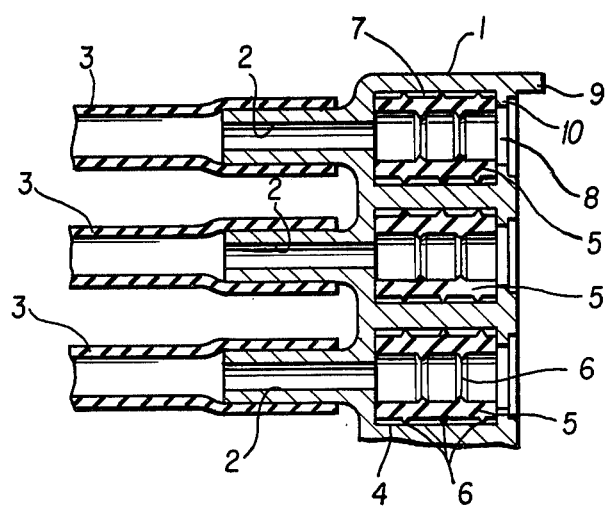
FIG. 1 is a partially longitudinal sectional view of one embodiment of a connector according to the invention.

Referring now to the drawings, especially FIG. 1, a connector 1 includes a housing provided with ports 2 projecting therefrom and airtightly received in rubber hoses 3. A plurality of bushings 5, each having three annular seals 6 which are pyramidal or triangular shaped in cross section at the outer periphery thereof and two annular seals 6 which are also pyramidal or triangular shaped in cross section at the inner periphery thereof, are airtightly inserted into openings 4 which are formed at the right side of the ports 2. Therefore, there are formed gaps 7 between the outer side of each bushing 5 and the inner side of the opening 4.

Each bushing 5 inserted in the port of the fluid pressure operating device (not shown) has the same gap 7 between the outer periphery of the port thereof and the inner periphery of bushing 5 as the spacing constituting gaps 7. Each seal 6 is thus airtightly inserted in the port of the device and the bushing provides equal sealing in both an upstream and downstream direction due to its pyramidal or triangular shape. If each port of the fluid pressure operating device is not coaxial to the corresponding bushing 5, the rubber-made bushing 5 will absorb this tolerance due to the elasticity thereof.

A sealing flange 10 extending from the housing portion of the connector 1 prevents each bushing 5 from being axially withdrawn. The sealing flange 10 is formed by thermal caulking extending in a radial direction from the inner peripheral surface of the housing of the connector 1 such that the ends of the openings 4 distal from the ports 2 are restricted. As a result, the bushing 5 is prevented from being axially removed from the housing of the connector 1. Because the sealing flange 10 is formed as an integal portion of the housing of the connector 1, it is not necessary to provide a separate member mounted on the housing of the connector 1, such as a ring plate installed in a circular slit formed in the inner surface of the body, to ensure retention of the bushing 5. A hollow portion (not shown) to be fitted with projection 9 extending from connector 1 is provided in the fluid pressure operating device in order to prevent connector 1 from being set installed upside-down in the port of the fluid pressure operating device.

Figure 2:
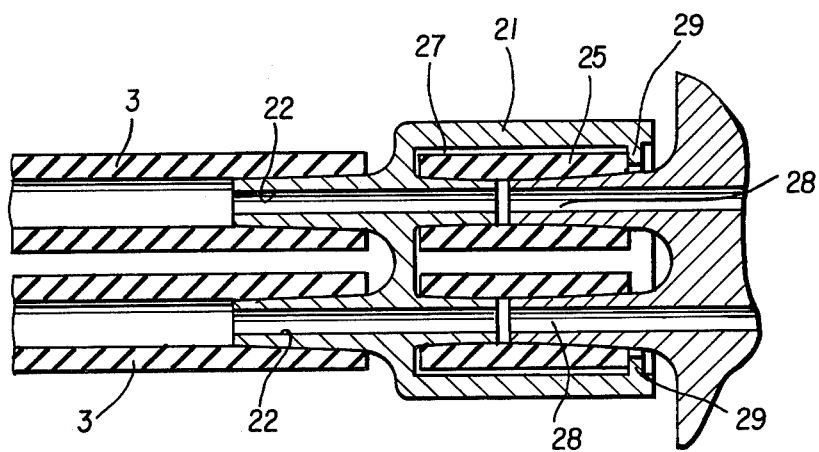
FIG. 2 is a view similar to FIG. 1, but showing another embodiment of the invention.
Figure 3:
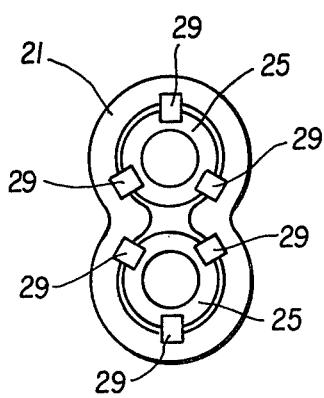
FIG. 3 is a side view, seen from the right of the embodiment of FIG. 2.

In the embodiment as seen in FIGS. 2 and 3, a rubber-made bushing 25 is airtightly inserted in each port 22 of connector 21 projecting toward the right of the drawing as well as in a port 28 of the fluid pressure operating device. In this embodiment, a gap 27 is formed in the outer surface of each bushing 25 to perform the same function as the gap 7 in the first embodiment, as seen in FIG. 1. A sealing flange 29 prevents the rubber-made bushing 25 from being axially withdrawn.

Figure 4:
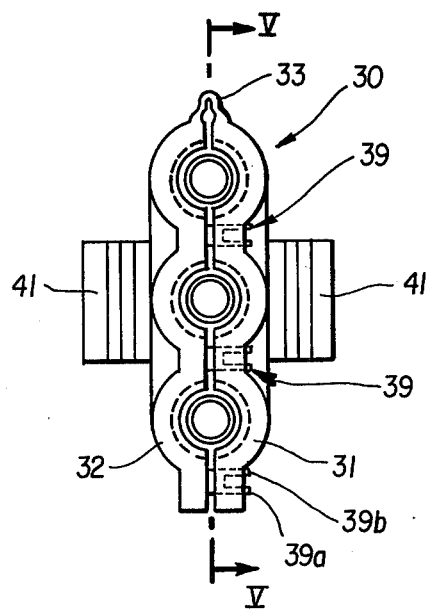
FIG. 4 is a side view of an illustration of another connector.
Figure 5:
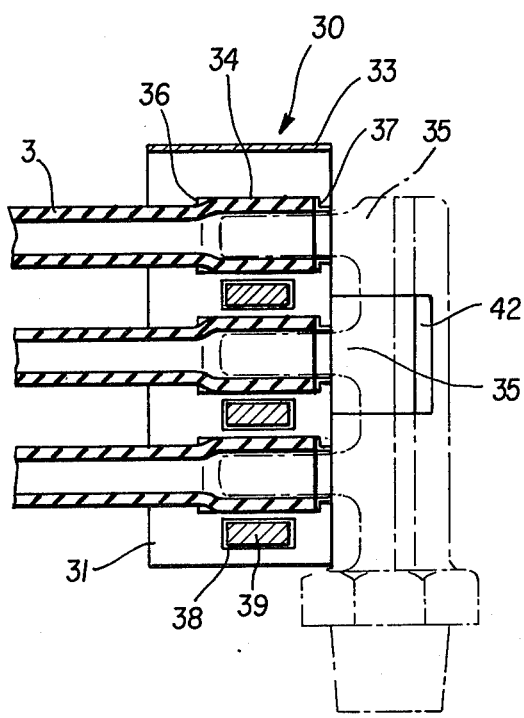
FIG. 5 is a sectional view taken along the line V—V of FIG. 4.
Figure 6:
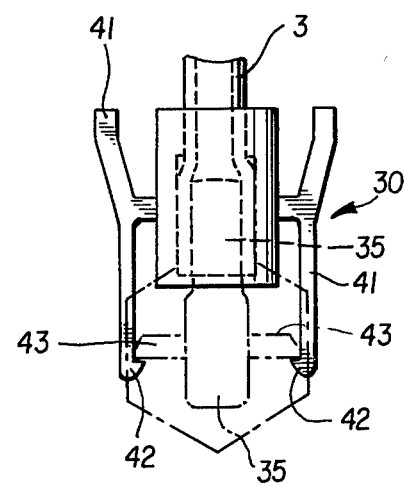
FIG. 6 is a plane view of FIG. 5.

In another embodiment, as seen in FIGS. 4, 5 and 6, a connector 30 has two pieces 31 and 32 forming a housing symmetrically stretching relative to a hinge 33 (FIG. 4). The first piece 31, as seen in FIG. 5, has three slots 34 in order to be confined within each hose 3, the radius of which is substantially equal to a radius of the hose 3 and provides semicircular shaped recess.

Step portions 36 and 37 each having a slightly enlarged slot are provided in the portion wherein each port 35 of the fluid pressure operating device shown in chain line in FIG. 5 is inserted into each hose 3, thereby preventing the hose from being axially withdrawn.

Thus, the hose 3 is kept from sliding within connector 30 after each hose 3 being attached to connector 30. There are also provided three square holes 38 spaced a predetermined distance on piece 31. Three extrusions 39 on the second piece 32 having two elastic divided pieces 39a and 39b with hook-shaped edges pass through square holes 38 on piece 31 by fitting first piece 31 to second piece 32, as seen in FIG. 4. Two elastic divided pieces 39a and 39b are snap-fitted at the edge of holes 38 on piece 32 by elastic force after the hook-shaped edge extending from extrusion 39 is passed through the hole 38 on piece 31. In this way, connector 30 joins the edge of each hose 3 to each port 35 of the fluid pressure operating device as seen in FIG. 4.

To attach connector 30 to each hose 3, each hose 3 is initially inserted into each port 35 one by one. Either one of the pieces 31 and 32 of connector 30 being opened is brought into engagement with one side of each hose 3. Then, the other of the pieces 31 and 32 is joined by bending one piece about the hinge 33 to pass two elastic divided pieces 39a, 39b with hook-shaped edges through the hole 38.

As seen in FIG. 6, a clasp 41 projects from the outer surface of each piece 31 and 32. A hook-shaped portion 42 at the edge of each clasp 41 prevents connector 30 from disconnecting from port 35 by engaging a projection 43 on the port 35. The connector 30 may be removed from the port 35 after opening the clasp 41 against its opposing elasticity. The invention, therefore, provides a connector which will easily engage each hose with port 35 without incorrect alignment.

It will be apparent to those skilled in the art that various modifications and variations could be made in the connector of this invention without departing from the scope or spirit of the invention.

What is claimed as new and desired to be secured by Letters Patent of the United States is:

1. A connector for interconnecting at least one hose with a fluid operating device, comprising:
   a housing having a plurality of ports formed therein such that each of said at least one hose interconnects therewith;
   said housing having a plurality of openings formed therein communicating with said plurality of ports, respectively;
   a bushing mounted within each of said plurality of openings for fluid communication with said fluid operating device;
   a sealing flange extending from said housing of said connector such that said sealing flange prevents each of said bushings from being axially removed from said housing;
   a plurality of annular sealing means formed on the outer periphery of each said bushing for airtight engagement with said housing wherein said plurality of annular sealing means formed on the outer periphery of each said bushing further comprises a plurality of first sealing means triangular in cross section such that each said bushing provides an equal sealing capacity in both an upstream and downstream direction; and
   a plurality of annular sealing means formed on the inner periphery of each said bushing wherein said plurality of annular sealing means formed on the inner periphery of each said bushing further comprises a plurality of second sealing means triangular in cross section such that each said bushing provides an equal sealing capacity in both an upstream and downstream direction wherein equidistant air gaps are formed between said first and second sealing means.

2. A connector as set forth in claim 1, wherein said plurality of first sealing means further comprises at least three seals and said plurality of second sealing means further comprises at least two seals.

3. A connector as set forth in claims 1, or 2 wherein said bushing comprises an elastic bushing.

* * * * *